United States Patent
Kim

(10) Patent No.: US 10,436,289 B2
(45) Date of Patent: Oct. 8, 2019

(54) AUTOMATIC TRANSMISSION FOR VEHICLE

(71) Applicant: HYUNDAI POWERTECH CO., LTD., Seosan-si, Chungcheongnam-do (KR)

(72) Inventor: Tae Hoon Kim, Hwaseong-si (KR)

(73) Assignee: HYUNDAI POWERTECH CO., LTD., Seosan-si, Chungsheongnam-Do (KR)

( * ) Notice: Subject to any disclaimer, the term of this patent is extended or adjusted under 35 U.S.C. 154(b) by 11 days.

(21) Appl. No.: 15/824,680

(22) Filed: Nov. 28, 2017

(65) Prior Publication Data

US 2018/0266523 A1 Sep. 20, 2018

(30) Foreign Application Priority Data

Mar. 15, 2017 (KR) .................. 10-2017-0032601

(51) Int. Cl.
 *F16H 3/66* (2006.01)

(52) U.S. Cl.
 CPC ....... *F16H 3/66* (2013.01); *F16H 2200/0069* (2013.01); *F16H 2200/2012* (2013.01); *F16H 2200/2048* (2013.01)

(58) Field of Classification Search
 CPC ............... F16H 3/66; F16H 2200/0069; F16H 2200/2012; F16H 2200/2048
 (Continued)

(56) References Cited

U.S. PATENT DOCUMENTS 7,613,975 B2* 11/2009 Jibry .................. G11B 20/1816
 360/31
8,152,683 B2* 4/2012 Phillips ..................... F16H 3/66
 475/275
(Continued)

FOREIGN PATENT DOCUMENTS

| KR | 10-2008-0033789 A | 4/2008 |
| KR | 10-2013-0031455 A | 3/2013 |
| KR | 10-1655656 B1 | 9/2016 |

OTHER PUBLICATIONS

Office Action dated May 15, 2018 in Korean Application No. 10-2017-0032601.

*Primary Examiner* — Leslie A Nicholson, III
(74) *Attorney, Agent, or Firm* — Saliwanchik, Lloyd & Eisenschenk

(57) ABSTRACT

An automatic transmission includes an input shaft; an output shaft; a first planetary gear set including rotation elements; a second planetary gear set connected to the input shaft, and including a rotation element which is connected with the first planetary gear set; a third planetary gear set including a rotation element which is connected with the first planetary gear set, and connected with the output shaft; a fourth planetary gear set including rotation elements which are connected with the second planetary gear set and the third planetary gear set, respectively; a rotation shaft unit connected to the first to the fourth planetary gear sets, and transferring power; three clutches selectively connecting predetermined elements of the rotation shaft unit or selectively connecting predetermined elements of the rotation shaft unit and the input shaft; and four brakes selectively connecting predetermined elements of the rotation shaft unit and a transmission housing.

17 Claims, 4 Drawing Sheets

(58) Field of Classification Search
USPC .......................................................... 475/331
See application file for complete search history.

(56) References Cited

U.S. PATENT DOCUMENTS

| | | | | |
|---|---|---|---|---|
| 8,403,802 B2* | 3/2013 | Wittkopp | ................... | F16H 3/66 |
| | | | | 475/276 |
| 8,506,443 B2* | 8/2013 | Seo | ........................... | F16H 3/66 |
| | | | | 475/280 |
| 8,512,197 B2* | 8/2013 | Mellet | ........................ | F16H 3/66 |
| | | | | 475/276 |
| 8,795,128 B2* | 8/2014 | Mellet | ........................ | F16H 3/66 |
| | | | | 475/275 |
| 9,052,003 B2* | 6/2015 | Garcia | ................... | F16H 37/046 |
| 9,506,560 B2* | 11/2016 | Tachibanada | ........... | F16H 61/12 |
| 10,047,833 B2* | 8/2018 | Kim | ........................ | F16H 3/66 |
| 10,088,018 B2* | 10/2018 | Hwang | .................... | F16H 3/66 |
| 2018/0073609 A1* | 3/2018 | Yoshino | ................... | F16D 13/52 |

* cited by examiner

FIG. 2

| | B1 | B2 | B3 | B4 | C1 | C2 | C3 | Gear ratio |
|---|---|---|---|---|---|---|---|---|
| 1 | ● | ● | | | | | | 4.205 |
| 2 | | ● | ● | | | ● | | 2.398 |
| 3 | | ● | | | | ● | ● | 1.643 |
| 4 | | ● | | | ● | ● | | 1.366 |
| 5 | | | | | ● | ● | ● | 1.000 |
| 6 | ● | | | | ● | ● | | 0.829 |
| 7 | ● | | | | | ● | ● | 0.650 |
| 8 | ● | | | | ● | | ● | 0.567 |
| 9 | ● | | ● | | | | ● | 0.458 |
| 10 | ● | | | ● | | | ● | 0.413 |
| R | ● | ● | | | ● | | | 2.393 |

FIG. 4

| | Gear ratio | C3 | C2 | C1 | B4 | B3 | B2 | B1 |
|---|---|---|---|---|---|---|---|---|
| 1 | 4.205 | | ● | | | | ● | ● |
| 2 | 2.398 | | ● | | | ● | ● | |
| 3 | 1.643 | ● | ● | | | | ● | |
| 4 | 1.366 | | ● | ● | | | ● | |
| 5 | 1.000 | ● | ● | ● | | | | |
| 6 | 0.829 | | ● | ● | | | | ● |
| 7 | 0.650 | ● | ● | | | | | ● |
| 8 | 0.567 | ● | | ● | | | | ● |
| 9 | 0.458 | ● | | | | ● | | ● |
| 10 | 0.413 | ● | | | ● | | | ● |
| R | 2.393 | | | ● | | | ● | ● |

AUTOMATIC TRANSMISSION FOR VEHICLE

CROSS-REFERENCE TO RELATED APPLICATION

This application claims benefit of Korean Patent Application No. 10-2017-0032601, filed Mar. 15, 2017, the disclosure of which is hereby incorporated by reference in its entirety.

BACKGROUND

1. Technical Field

Embodiments of the present disclosure relate to an automatic transmission for a vehicle, and more particularly, to an automatic transmission for a vehicle which realizes forward 10-speed and reverse 1-speed shift stages by using four planetary gear sets, three clutches and four brakes.

2. Related Art

Generally, an automatic transmission is realized by a combination of a plurality of planetary gear sets, and functions to transfer a rotational power transferred from a torque converter, to an output shaft, by automatically shifting a speed to multiple stages.

In the automatic transmission, the more shift stages are realized, the more appropriate transmission gear ratios may be designed and the more it is possible to realize a vehicle which is excellent in terms of power performance and fuel economy. Therefore, researches have been continuously conducted to realize an increased number of shift stages.

Even if the same shift stages are realized, the automatic transmission has a different operation mechanism depending on a connection construction of rotation elements each including a sun gear, a planetary carrier and a ring gear.

In the meantime, in the automatic transmission, while a plurality of shift stages are realized, an operating condition in which one friction member is released and another friction member is operated when making a shift to a neighboring shift stage should be satisfied from the viewpoint of transmission control.

A background art of the present disclosure is disclosed in Korean Unexamined Patent Publication No. 2008-0033789 (published on Apr. 17, 2008 and entitled "9-speed gear train of automatic transmission for vehicle").

SUMMARY

Various embodiments are directed to providing an automatic transmission for a vehicle which realizes forward 10-speed and reverse 1-speed shift stages by using four planetary gear sets, three clutches and four brakes.

In an embodiment, an automatic transmission for a vehicle may include: an input shaft receiving power of an engine; an output shaft disposed at a position separated from the input shaft and outputting speed-shifted power; a first planetary gear set including a plurality of rotation elements; a second planetary gear set connected to the input shaft, receiving power therefrom, and including a rotation element which is connected with the first planetary gear set; a third planetary gear set including a rotation element which is connected with the first planetary gear set, and connected with the output shaft; a fourth planetary gear set including rotation elements which are connected with the second planetary gear set and the third planetary gear set, respectively; a rotation shaft unit connected to the first planetary gear set to the fourth planetary gear set, and transferring power; three clutches selectively connecting predetermined elements of the rotation shaft unit or selectively connecting predetermined elements of the rotation shaft unit and the input shaft; and four brakes selectively connecting predetermined elements of the rotation shaft unit and a transmission housing.

The first planetary gear set may include a first sun gear connected with the second planetary gear set; a first ring gear connected with the third planetary gear set; and a first carrier disposed between the first sun gear and the first ring gear, and selectively connected to the transmission housing through any one of the brakes.

The second planetary gear set may include a second sun gear connected with the fourth planetary gear set; a second ring gear connected with the first planetary gear set; and a second carrier disposed between the second sun gear and the second ring gear, and always connected to the input shaft.

The third planetary gear set may include a third sun gear connected with the first planetary gear set; a third ring gear connected to the output shaft; and a third carrier disposed between the third sun gear and the third ring gear, and connected to the fourth planetary gear set.

The fourth planetary gear set may include a fourth sun gear connected with the second planetary gear set; a fourth ring gear selectively connected to the transmission housing through any one of the brakes; and a fourth carrier disposed between the fourth sun gear and the fourth ring gear, and connected to the third planetary gear set.

Rotation shafts included in the rotation shaft unit may be seven.

The rotation shaft unit may include a first rotation shaft connecting the second planetary gear set and the fourth planetary gear set; a second rotation shaft connecting the first planetary gear set and the second planetary gear set; a third rotation shaft connected to the first planetary gear set; a fourth rotation shaft connecting the third planetary gear set and the fourth planetary gear set; a fifth rotation shaft connected to the fourth planetary gear set; a sixth rotation shaft connecting the first planetary gear set and the third planetary gear set; and a seventh rotation shaft connected to the first planetary gear set.

The first rotation shaft may connect the second sun gear and the fourth sun gear.

The second rotation shaft may connect the first sun gear and the second ring gear.

The third rotation shaft may be connected to the first carrier.

The fourth rotation shaft may connect the third carrier and the fourth carrier.

The fifth rotation shaft may be connected to the fourth ring gear.

The sixth rotation shaft may connect the third sun gear and the first ring gear.

The seventh rotation shaft may be connected to the first ring gear.

The brakes may include a first brake which selectively connects the first rotation shaft and the transmission housing.

The brakes may include a second brake which selectively connects the fifth rotation shaft and the transmission housing.

The brakes may include a third brake which selectively connects any one of the sixth rotation shaft and the seventh rotation shaft and the transmission housing.

The brakes may include a fourth brake which selectively connects the third rotation shaft and the transmission housing.

The clutches may include a first clutch which selectively connects the input shaft and the seventh rotation shaft.

The clutches may include a second clutch which selectively connects the third rotation shaft and the fourth rotation shaft.

The clutches may include a third clutch which selectively connects the second rotation shaft and the fourth rotation shaft.

Multiple shift stages of forward 10-speed and reverse 1-speed shift stages may be realized through operations of the first planetary gear set, the second planetary gear set, the third planetary gear set, the fourth planetary gear set, the rotation shaft unit, the clutches and the brakes.

The multiple shift stages may include a reverse shift stage that is realized as the first brake, the second brake and the first clutch operate.

The multiple shift stages may include a forward 1-speed shift stage that is realized as the first brake, the second brake and the second clutch operate.

The multiple shift stages may include a forward 2-speed shift stage that is realized as the second brake, the third brake and the second clutch operate.

The multiple shift stages may include a forward 3-speed shift stage that is realized as the second brake, the second clutch and the third clutch operate.

The multiple shift stages may include a forward 4-speed shift stage that is realized as the second brake, the first clutch and the second clutch operate.

The multiple shift stages may include a forward 5-speed shift stage that is realized as the first clutch, the second clutch and the third clutch operate.

The multiple shift stages may include a forward 6-speed shift stage that is realized as the first brake, the first clutch and the second clutch operate.

The multiple shift stages may include a forward 7-speed shift stage that is realized as the first brake, the second clutch and the third clutch operate.

The multiple shift stages may include a forward 8-speed shift stage that is realized as the first brake, the first clutch and the third clutch operate.

The multiple shift stages may include a forward 9-speed shift stage that is realized as the first brake, the third brake and the third clutch operate.

The multiple shift stages may include a forward 10-speed shift stage that is realized as the first brake, the fourth brake and the third clutch operate.

The first ring gear may be engaged with the first carrier by being split into a plurality of parts, and the third rotation shaft may be connected with the fourth brake by passing between the plurality of parts into which the first ring gear is split.

The first ring gear may be split into two and may include a first split gear and a second split gear, and rpms of the sixth rotation shaft which is connected to the first split gear and the seventh rotation shaft which is connected to the second split gear may be the same.

The first planetary gear set, the third planetary gear set, the second planetary gear set and the fourth planetary gear set may be disposed close to the input shaft in that sequence.

According to the embodiments of the present disclosure, the automatic transmission for a vehicle may realize forward 10-speed and reverse 1-speed shift stages by using four planetary gear sets, three clutches and four brakes.

Also, according to the embodiments of the present disclosure, since an output shaft is connected to a planetary gear set which is positioned second from an input shaft, the size of the transmission may be reduced, and the vehicle mountability may be improved.

Further, according to the embodiments of the present disclosure, since a first ring gear is split into two and forms a passage for connecting a first carrier and a fourth brake, the connection of the first carrier and the fourth brake may be easily implemented.

BRIEF DESCRIPTION OF THE DRAWINGS

FIG. 2 is an operation table illustrating respective shift stages of the automatic transmission for a vehicle in accordance with the embodiment of the present disclosure.

FIG. 4 is an operation table illustrating respective shift stages of the automatic transmission for a vehicle in accordance with another embodiment of the present disclosure.

DETAILED DESCRIPTION

Hereinafter, an automatic transmission for a vehicle will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
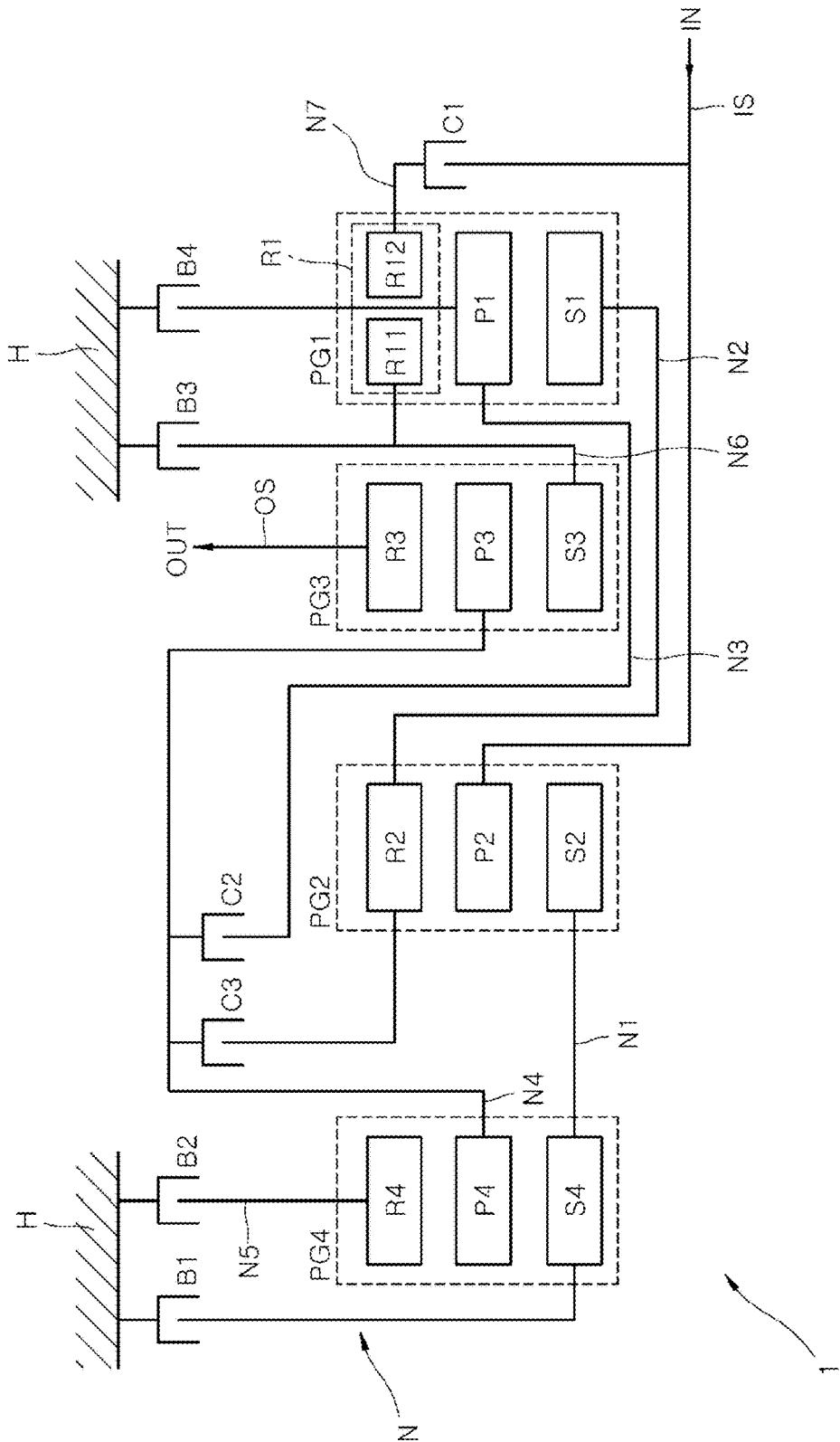
FIG. 1 is a construction diagram schematically illustrating the structure of an automatic transmission for a vehicle in accordance with an embodiment of the present disclosure.

FIG. 1 is a construction diagram schematically illustrating the structure of an automatic transmission for a vehicle in accordance with an embodiment of the present disclosure, and FIG. 2 is an operation table illustrating respective shift stages of the automatic transmission for a vehicle in accordance with the embodiment of the present disclosure.

As shown in FIGS. 1 and 2, an automatic transmission for a vehicle 1 in accordance with an embodiment of the present disclosure includes an input shaft IS which receives the power of an engine, an output shaft OS which is disposed at a position separated from the input shaft IS and outputs speed-shifted power, a first planetary gear set PG1 which includes a plurality of rotation elements, a second planetary gear set PG2 which is connected to the input shaft IS, receives power therefrom and includes a rotation element connected with the first planetary gear set PG1, a third planetary gear set PG3 which includes a rotation element connected with the first planetary gear set PG1 and is connected with the output shaft OS, a fourth planetary gear set PG4 which includes rotation elements connected with the second planetary gear set PG2 and the third planetary gear set PG3, respectively, a rotation shaft unit N which is connected with the first planetary gear set PG1 to the fourth planetary gear set PG4 and transfers power, three clutches which selectively connect predetermined elements of the rotation shaft unit N or selectively connect predetermined elements of the rotation shaft unit N and the input shaft IS, and four brakes which selectively connect predetermined elements of the rotation shaft unit N and a transmission housing H.

The automatic transmission for a vehicle 1 includes the input shaft IS, the first planetary gear set PG1, the second planetary gear set PG2, the third planetary gear set PG3, the fourth planetary gear set PG4, and the output shaft OS. According to this fact, the power inputted from the input shaft IS is outputted through the output shaft OS after being speed-shifted by the complementary operations of the first, second, third and fourth planetary gear sets PG1, PG2, PG3 and PG4.

The input shaft IS which receives the power of the engine is an input member, and rotation power that is inputted from the crankshaft of the engine and is torque-converted through a torque converter is inputted to the input shaft IS. The output shaft OS which is disposed at the position separated from the input shaft IS and outputs speed-shifted power is an output member, and transfers driving force to drive driving wheels through a differential gear.

Since a plurality of rotation elements are engaged and rotated in the first planetary gear set PG1, various kinds of planetary gear drives may be used within a technical idea that speed shift is implemented. The first planetary gear set PG1 in accordance with the embodiment of the present disclosure includes a first sun gear S1, a first ring gear R1 and a first carrier P1 which is engaged between the first sun gear S1 and the first ring gear R1. The first sun gear S1 is always connected with a second ring gear R2 of the second planetary gear set PG2, and the first ring gear R1 is always connected with a third sun gear S2 of the third planetary gear set PG3. The first carrier P1 is disposed between the first sun gear S1 and the first ring gear R1, and is selectively connected to or disconnected from the transmission housing H through a brake.

The first ring gear R1 of the first planetary gear set PG1 is engaged with the first carrier P1 by being split into a plurality of parts, and a third rotation shaft N3 is connected with a fourth brake B4 by passing between the plurality of parts into which the first ring gear R1 is split. That is to say, since the first ring gear R1 is disposed in a split shape, the connection of the first carrier P1 and the fourth brake B4 which are disposed at both sides of the first ring gear R1 may be easily implemented.

The first ring gear R1 in accordance with the embodiment is split into two and is constructed by a first split gear R11 and a second split gear R12. Since the first split gear R11 and the second split gear R12 are rotated by being engaged with a first pinion, the rpms thereof are the same.

Describing this in detail, the first ring gear R1 is split into the plurality of parts to form a passage through which the third rotation shaft N3 connected with the first carrier P1 is directly connected to the fourth brake B4, and is rotated by being engaged with the first carrier P1. The first ring gear R1 in accordance with the embodiment is split into two and includes the first split gear R11 and the second split gear R12, and the rpms of a sixth rotation shaft N6 which is connected to the first split gear R11 and a seventh rotation shaft N7 which is connected to the second split gear R12 are the same. Therefore, even when a third brake B3 is selectively connected to the sixth rotation shaft N6 or is selectively connected to the seventh rotation shaft N7, the automatic transmission for a vehicle 1 implements the same function. The third brake B3 in accordance with the embodiment is fixed to the transmission housing H, and is selectively connected to or disconnected from the sixth rotation shaft N6.

The second planetary gear set PG2 is connected to the input shaft IS and receives power therefrom, and various kinds of planetary gear drives may be used within a technical idea that a rotation element connected with the first planetary gear set PG1 is included therein. The second planetary gear set PG2 in accordance with the embodiment of the present disclosure includes a second sun gear S2, the second ring gear R2 and a second carrier P2 which is engaged between the second sun gear S2 and the second ring gear R2. The second sun gear S2 is directly connected to a fourth sun gear S4 of the fourth planetary gear set PG4, and the second ring gear R2 is directly connected to the first sun gear S1 of the first planetary gear set PG1. The second carrier P2 is disposed between the second sun gear S2 and the second ring gear R2, and is always connected to the input shaft IS and receives power therefrom.

The third planetary gear set PG3 includes a rotation element which is connected with the first planetary gear set PG1, and is connected to the output shaft OS. The third planetary gear set PG3 in accordance with the embodiment of the present disclosure includes the third sun gear S3, a third ring gear R3 and a third carrier P3 which is engaged between the third sun gear S3 and the third ring gear R3. The third sun gear S3 is always connected to the first ring gear R1 of the first planetary gear set PG1, and is selectively connected to or disconnected from the transmission housing H through a brake. The third ring gear R3 is connected to the output shaft OS, and the third carrier P3 is disposed between the third sun gear S3 and the third ring gear R3 and is connected to a fourth carrier P4 of the fourth planetary gear set PG4.

The fourth planetary gear set PG4 includes rotation elements which are connected to the second planetary gear set PG2 and the third planetary gear set PG3, respectively. The fourth planetary gear set PG4 in accordance with the embodiment of the present disclosure includes the fourth sun gear S4, a fourth ring gear R4 and the fourth carrier P4 which is engaged between the fourth sun gear S4 and the fourth ring gear R4.

The fourth sun gear S4 is directly connected to the second sun gear S2 of the second planetary gear set PG2, and the fourth ring gear R4 is selectively connected to or disconnected from the transmission housing H through a brake. The fourth carrier P4 is disposed between the fourth sun gear S4 and the fourth ring gear R4, and is connected to the third carrier P3 of the third planetary gear set PG3.

In the automatic transmission for a vehicle 1 in accordance with the embodiment of the present embodiment, the first planetary gear set PG1, the third planetary gear set PG3, the second planetary gear set PG2 and the fourth planetary gear set PG4 are disposed close to the input shaft IS in that order from one end (the right end in FIG. 1) where the input shaft IS is positioned toward the other end (the left end in FIG. 1). That is to say, among the first planetary gear set PG1 to the fourth planetary gear set PG4, the first planetary gear set PG1 is disposed closest to the input shaft IS. Since the output shaft OS is connected to the third planetary gear set PG3 which is second close to the input shaft IS, the outer shape of the automatic transmission for a vehicle 1 is reduced, by which an advantage is provided in terms of mounting the automatic transmission for a vehicle 1 to a vehicle.

In the automatic transmission for a vehicle 1 in accordance with the embodiment of the present disclosure, power is transferred by nine rotation elements including the input shaft IS, the output shaft OS and seven rotation shafts. The rotation shaft unit N transfers power by being connected to the first planetary gear set PG1 to the fourth planetary gear set PG4. The number of rotation shafts included in the rotation shaft unit N in accordance with the embodiment is limited to seven.

A first rotation shaft N1 always connects one rotation element of the second planetary gear set PG2 and one rotation element of the fourth planetary gear set PG4. For example, the first rotation shaft N1 may always connect the second sun gear S2 and the fourth sun gear S4.

A second rotation shaft N2 always connects one rotation element of the first planetary gear set PG1 and one rotation element of the second planetary gear set PG2. For example, the second rotation shaft N2 may always connect the first sun gear S1 and the second ring gear R2.

The third rotation shaft N3 is connected to one rotation element of the first planetary gear set PG1. For example, the third rotation shaft N3 has one end which is connected to the first carrier P1 and the other end which is selectively connected to or disconnected from a second clutch C2.

A fourth rotation shaft N4 always connects one rotation element of the third planetary gear set PG3 and one rotation element of the fourth planetary gear set PG4. For example, the fourth rotation shaft N4 may always connect the third carrier P3 and the fourth carrier P4. Also, the second clutch C2 and a third clutch C3 are connected to the fourth rotation shaft N4.

A fifth rotation shaft N5 is connected to one rotation element of the fourth planetary gear set PG4. For example, the fifth rotation shaft N5 has one end which is connected to the fourth ring gear R4 and the other end which is selectively connected to or disconnected from a second brake B2.

The sixth rotation shaft N6 always connects one rotation element of the first planetary gear set PG1 and one rotation element of the third planetary gear set PG3. For example, the sixth rotation shaft N6 always connects the third sun gear S3 and the first ring gear R1. Describing this in detail, the sixth rotation shaft N6 has one end which is connected to the third sun gear S3 and the other end which is connected to the first split gear R11 of the first ring gear R1. Further, the sixth rotation shaft N6 is selectively connected to or disconnected from the third brake B3.

The seventh rotation shaft N7 is connected to one rotation element of the first planetary gear set PG1. For example, the seventh rotation shaft N7 has one end which is connected to the second split gear R12 of the first ring gear R1 and the other end which is connected to a first clutch C1.

As clutches, various kinds of clutches may be used within a technical idea that they selectively connect predetermined elements of the rotation shaft unit N or selectively connect predetermined elements of the rotation shaft unit N and the input shaft IS. In the automatic transmission for a vehicle 1 in accordance with the embodiment, three clutches are used. These clutches include the first clutch C1, the second clutch C2 and the third clutch C3.

The first clutch C1 selectively connects or disconnects the input shaft IS and the seventh rotation shaft N7. The second clutch C2 selectively connects or disconnects the third rotation shaft N3 and the fourth rotation shaft N4. The third clutch C3 selectively connects or disconnects the second rotation shaft N2 and the fourth rotation shaft N4.

As brakes, various kinds of brakes may be used within a technical idea that they selectively connect predetermined elements of the rotation shaft unit N and the transmission housing H. In the automatic transmission for a vehicle 1 in accordance with the embodiment, four brakes are used. These brakes include a first brake B1, the second brake B2, the third brake B3 and the fourth brake B4. The first brake B1, the second brake B2, the third brake B3 and the fourth brake B4 are respectively fixed to the transmission housing H, and are selectively connected to or disconnected from predetermined rotation shafts.

The first brake B1 selectively connects or disconnects the first rotation shaft N1 and the transmission housing H. The second brake B2 selectively connects or disconnects the fifth rotation shaft N5 and the transmission housing H. The third brake B3 selectively connects or disconnects any one of the sixth rotation shaft N6 and the seventh rotation shaft N7 and the transmission housing H. The fourth brake B4 selectively connects or disconnects the third rotation shaft N3 and the transmission housing H. The third brake B3 in accordance with the embodiment selectively connects or disconnects the sixth rotation shaft N6 and the transmission housing H.

Moreover, the automatic transmission for a vehicle 1 in accordance with the embodiment of the present disclosure realizes multiple shift stages of forward 10-speed and reverse 1-speed shift stages through the operations of the first planetary gear set PG1, the second planetary gear set PG2, the third planetary gear set PG3, the fourth planetary gear set PG4, the rotation shaft unit N, the clutches and the brakes.

Among the multiple shift stages, the reverse 1-speed shift stage is realized as the first brake B1, the second brake B2 and the first clutch C1 operate simultaneously. The forward 1-speed shift stage is realized as the first brake B1, the second brake B2 and the second clutch C2 operate simultaneously. The forward 2-speed shift stage is realized as the second brake B2, the third brake B3 and the second clutch C2 operate simultaneously. The forward 3-speed shift stage is realized as the second brake B2, the second clutch C2 and the third clutch C3 operate simultaneously. The forward 4-speed shift stage is realized as the second brake B2, the first clutch C1 and the second clutch C2 operate simultaneously. The forward 5-speed shift stage is realized as the first clutch C1, the second clutch C2 and the third clutch C3 operate simultaneously. The forward 6-speed shift stage is realized as the first brake B1, the first clutch C1 and the second clutch C2 operate simultaneously. The forward 7-speed shift stage is realized as the first brake B1, the second clutch C2 and the third clutch C3 operate simultaneously. The forward 8-speed shift stage is realized as the first brake B1, the first clutch C1 and the third clutch C3 operate simultaneously. The forward 9-speed shift stage is realized as the first brake B1, the third brake B3 and the third clutch C3 operate simultaneously. The forward 10-speed shift stage is realized as the first brake B1, the fourth brake B4 and the third clutch C3 operate simultaneously.

Hereafter, an automatic transmission for a vehicle 10 in accordance with another embodiment of the present disclosure will be described with reference to drawings.

For the sake of convenience in explanation, the same reference numerals will be used for components of which construction and function are the same as those of the aforementioned embodiment, and detailed descriptions thereof will be omitted herein.

Figure 3:
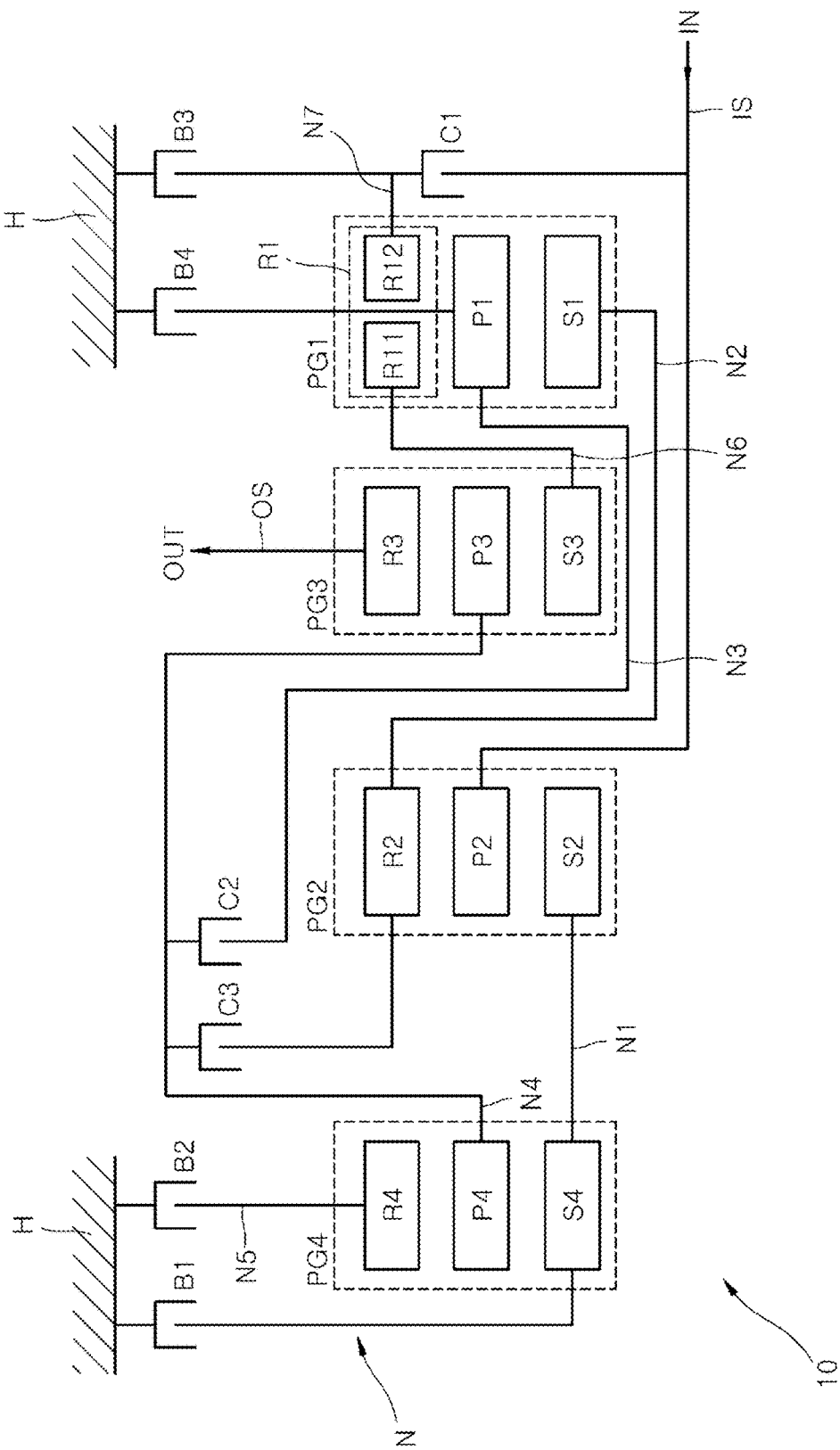
FIG. 3 is a construction diagram schematically illustrating the structure of an automatic transmission for a vehicle in accordance with another embodiment of the present disclosure.

FIG. 3 is a construction diagram schematically illustrating the structure of an automatic transmission for a vehicle in accordance with another embodiment of the present disclosure, and FIG. 4 is an operation table illustrating respective shift stages of the automatic transmission for a vehicle in accordance with another embodiment of the present disclosure.

As shown in FIGS. 3 and 4, in the automatic transmission for a vehicle 10 in accordance with another embodiment of the present disclosure, a sixth rotation shaft N6 directly connects a third sun gear S3 and a first ring gear R1. The sixth rotation shaft N6 has one end which is connected to the third sun gear S3 and the other end which is connected to a first split gear R11 of the first ring gear R1.

One end of a seventh rotation shaft N7 is connected to a second split gear R12 of the first ring gear R1, and the other end of the seventh rotation shaft N7 is branched in directions facing a first clutch C1 and a third brake B3, respectively. Therefore, the seventh rotation shaft N7 may be selectively connected to or disconnected from an input shaft IS through the operation of the first clutch C1. Also, as the seventh rotation shaft N7 is selectively connected to a transmission housing H through the operation of the third brake B3, the rotation of the seventh rotation shaft N7 may be restricted. In the case where the operation of the third brake B3 is released, since the seventh rotation shaft N7 and the third brake B3 are separated, the rotation of the seventh rotation shaft N7 is not restricted.

Since the other constructions except the connection states of the sixth rotation shaft N6 and the seventh rotation shaft N7 are the same as those of the aforementioned embodiment, detailed descriptions thereof and descriptions for operation states will be omitted herein.

The automatic transmission for a vehicle 10 in accordance with another embodiment of the present disclosure realizes multiple shift stages of forward 10-speed and reverse 1-speed shift stages through the operations of a first planetary gear set PG1, a second planetary gear set PG2, a third planetary gear set PG3, a fourth planetary gear set PG4, a rotation shaft unit N, clutches and brakes. Since detailed operations according thereto are the same as those of the aforementioned embodiment, detailed descriptions thereof will be omitted herein.

As described above, the automatic transmissions for a vehicle 1 and 10 according to the present disclosure may realize forward 10-speed and reverse 1-speed shift stages by combining the first, second, third and fourth planetary gear sets PG1, PG2, PG3 and PG4, the first, second and third clutches C1, C2 and C3 and the first, second, third and fourth brakes B1, B2, B3 and B4. Also, because the output shaft OS is connected to a planetary gear set which is positioned second from an input end (the right end of FIG. 1) of the input shaft IS, the size of a transmission may be reduced, and the vehicle mountability may be improved. Further, since the first ring gear R1 is split into two and forms a passage for connecting the first carrier P1 and the fourth brake B4, the connection of the first carrier P1 and the fourth brake B4 may be easily implemented. Furthermore, in the present disclosure, since the number of clutches is decreased in comparison with the conventional art, the cost of parts may be reduced, the outer shapes of the automatic transmissions for a vehicle 1 and 10 may be scaled down, and a drag torque may be decreased.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An automatic transmission for a vehicle, comprising:
    an input shaft receiving power of an engine;
    an output shaft disposed at a position separated from the input shaft and outputting speed-shifted power;
    a first planetary gear set including a plurality of rotation elements;
    a second planetary gear set connected to the input shaft, receiving power therefrom, and including a rotation element that is connected with the first planetary gear set;
    a third planetary gear set including a rotation element that is connected with the first planetary gear set, and connected with the output shaft;
    a fourth planetary gear set including rotation elements that are connected with the second planetary gear set and the third planetary gear set, respectively;
    a rotation shaft unit connected to the first planetary gear set to the fourth planetary gear set, and transferring power;
    three clutches selectively connecting predetermined elements of the rotation shaft unit or selectively connecting predetermined elements of the rotation shaft unit and the input shaft; and
    four brakes selectively connecting predetermined elements of the rotation shaft unit and a transmission housing,
    wherein the first planetary gear set comprises:
        a first sun gear connected with the second planetary gear set;
        a first ring gear connected with the third planetary gear set; and
        a first carrier disposed between the first sun gear and the first ring gear, and selectively connected to the transmission housing through any one of the brakes, and
    wherein the second planetary gear set comprises:
        a second sun gear connected with the fourth planetary gear set;
        a second ring gear connected with the first planetary gear set; and
        a second carrier disposed between the second sun gear and the second ring gear, and always connected to the input shaft.

2. The automatic transmission according to claim 1, wherein the third planetary gear set comprises:
    a third sun gear connected with the first planetary gear set;
    a third ring gear connected to the output shaft; and
    a third carrier disposed between the third sun gear and the third ring gear, and connected to the fourth planetary gear set.

3. The automatic transmission according to claim 2, wherein the fourth planetary gear set comprises:
    a fourth sun gear connected with the second planetary gear set;
    a fourth ring gear selectively connected to the transmission housing through any one of the brakes; and
    a fourth carrier disposed between the fourth sun gear and the fourth ring gear, and connected to the third planetary gear set.

4. The automatic transmission according to claim 3, wherein the rotation shaft unit comprises:
    a first rotation shaft connecting the second planetary gear set and the fourth planetary gear set;
    a second rotation shaft connecting the first planetary gear set and the second planetary gear set;
    a third rotation shaft connected to the first planetary gear set;
    a fourth rotation shaft connecting the third planetary gear set and the fourth planetary gear set;
    a fifth rotation shaft connected to the fourth planetary gear set;
    a sixth rotation shaft connecting the first planetary gear set and the third planetary gear set; and a seventh rotation shaft connected to the first planetary gear set.

5. The automatic transmission according to claim 4, wherein the first rotation shaft connects the second sun gear and the fourth sun gear,
the second rotation shaft connects the first sun gear and the second ring gear,
the third rotation shaft is connected to the first carrier,
the fourth rotation shaft connects the third carrier and the fourth carrier,
the fifth rotation shaft is connected to the fourth ring gear,
the sixth rotation shaft connects the third sun gear and the first ring gear, and
the seventh rotation shaft is connected to the first ring gear.

6. The automatic transmission according to claim 5, wherein the brakes comprise a first brake that selectively connects the first rotation shaft and the transmission housing.

7. The automatic transmission according to claim 6, wherein the brakes comprise a second brake that selectively connects the fifth rotation shaft and the transmission housing.

8. The automatic transmission according to claim 7, wherein the brakes comprise a third brake that selectively connects any one of the sixth rotation shaft and the seventh rotation shaft and the transmission housing.

9. The automatic transmission according to claim 8, wherein the brakes comprise a fourth brake that selectively connects the third rotation shaft and the transmission housing.

10. The automatic transmission according to claim 9, wherein the clutches comprise a first clutch that selectively connects the input shaft and the seventh rotation shaft.

11. The automatic transmission according to claim 10, wherein the clutches comprise a second clutch that selectively connects the third rotation shaft and the fourth rotation shaft.

12. The automatic transmission according to claim 11, wherein the clutches comprise a third clutch that selectively connects the second rotation shaft and the fourth rotation shaft.

13. The automatic transmission according to claim 12, wherein multiple shift stages of forward 10-speed and reverse 1-speed shift stages are realized through operations of the first planetary gear set, the second planetary gear set, the third planetary gear set, the fourth planetary gear set, the rotation shaft unit, the clutches and the brakes.

14. The automatic transmission according to claim 13, wherein the multiple shift stages comprises:
a reverse shift stage that is realized as the first brake, the second brake and the first clutch operate;
a forward 1-speed shift stage that is realized as the first brake, the second brake and the second clutch operate;
a forward 2-speed shift stage that is realized as the second brake, the third brake and the second clutch operate;
a forward 3-speed shift stage that is realized as the second brake, the second clutch and the third clutch operate;
a forward 4-speed shift stage that is realized as the second brake, the first clutch and the second clutch operate;
a forward 5-speed shift stage that is realized as the first clutch, the second clutch and the third clutch operate;
a forward 6-speed shift stage that is realized as the first brake, the first clutch and the second clutch operate;
a forward 7-speed shift stage that is realized as the first brake, the second clutch and the third clutch operate;
a forward 8-speed shift stage that is realized as the first brake, the first clutch and the third clutch operate;
a forward 9-speed shift stage that is realized as the first brake, the third brake and the third clutch operate; and
a forward 10-speed shift stage that is realized as the first brake, the fourth brake and the third clutch operate.

15. The automatic transmission according to claim 9, wherein the first ring gear is engaged with the first carrier by being split into a plurality of parts, and
wherein the third rotation shaft is connected with the fourth brake by passing between the plurality of parts into which the first ring gear is split.

16. The automatic transmission according to claim 15, wherein the first ring gear is split into two and includes a first split gear and a second split gear, and rpms of the sixth rotation shaft that is connected to the first split gear and the seventh rotation shaft that is connected to the second split gear are the same.

17. The automatic transmission according to claim 16, wherein the first planetary gear set, the third planetary gear set, the second planetary gear set and the fourth planetary gear set are disposed close to the input shaft in that sequence.

* * * * *